United States Patent
Maruyama et al.

[11] Patent Number: 6,100,497
[45] Date of Patent: Aug. 8, 2000

[54] METHOD OF AND APPARATUS FOR WELDING WORKPIECE

[75] Inventors: Iwao Maruyama; Kazuhide Matsuo; Takanori Fujii, all of Kawagoe, Japan

[73] Assignee: Honda Giken Kogyo Kabushiki Kaisha, Tokyo, Japan

[21] Appl. No.: 09/056,093

[22] Filed: Apr. 7, 1998

[30]  Foreign Application Priority Data

Apr. 7, 1997  [JP]  Japan .................................. 9-088391

[51] Int. Cl.$^7$ .................................................. B23K 26/00
[52] U.S. Cl. ............................. 219/121.63; 219/121.64; 219/121.77
[58] Field of Search ......................... 219/121.63, 121.6, 219/121.11, 121.64, 86.1, 86.21, 86.23, 86.24, 121.76, 121.77; 228/175, 176

[56] References Cited

U.S. PATENT DOCUMENTS

| | | | |
|---|---|---|---|
| 3,586,816 | 6/1971 | Hasgen ..................................... | 219/121 |
| 4,560,856 | 12/1985 | Miller et al. ....................... | 219/121 LC |
| 4,607,150 | 8/1986 | Bannister .......................... | 219/121 LC |
| 4,654,505 | 3/1987 | Sciaky et al. ..................... | 219/121 LC |
| 5,484,982 | 1/1996 | Nihei et al. ......................... | 219/121.79 |

FOREIGN PATENT DOCUMENTS

| | | |
|---|---|---|
| 0276664 | 8/1988 | European Pat. Off. . |
| 0607456A1 | 7/1994 | European Pat. Off. . |
| 2549759 | 2/1985 | France . |
| 4-36792 | 6/1992 | Japan . |

*Primary Examiner*—Patrick Ryan
*Assistant Examiner*—M. Alexandra Elve
*Attorney, Agent, or Firm*—Birch, Stewart, Kolasch & Birch, LLP

[57]  ABSTRACT

Scanning welding heads are introduced through respective openings of a workpiece into the workpiece by respective welding robots. When a laser beam is emitted from a laser beam emitting device, the laser beam is applied to a beam splitter of one of the welding robots, which reflects about 50% of the energy of the laser beam and introduces the laser beam into a scanning welding head. The beam splitter passes the remaining 50% of the energy of the laser beam therethrough. The laser beam that has passed through the beam splitter is reflected by a totally reflecting mirror of another scanning welding head. The scanning welding heads apply the laser beam to respective regions in the workpiece to weld the workpiece.

7 Claims, 5 Drawing Sheets

METHOD OF AND APPARATUS FOR WELDING WORKPIECE

BACKGROUND OF THE INVENTION

1. Field of the Invention

The present invention relates to a method of and an apparatus for welding a workpiece in a manufacturing process such as for manufacturing automobiles.

2. Description of the Related Art

On automobile production lines, a plurality of panel-like workpieces are assembled and welded into an automobile body. For producing such an automobile body, it has heretofore been customary to grip and position workpieces with clamp jigs, and weld the workpieces at a plurality of spots thereon with resistance spot welding machines. Since it is necessary to displace a resistance spot welding machine into contact with workpieces without engaging clamp jigs, the spots where the workpieces can be welded by the resistance spot welding machine are limited by the clamp jigs, possibly resulting in lack of sufficient mechanical strength at some welded regions of the workpieces. One solution to this problem has been to weld workpieces according to a two-stage welding process. In the two-stage welding process, workpieces are provisionally welded such that the welded workpieces will remain assembled in a desired shape after they are removed from the clamp jigs, and then removed from the clamp jigs, after which the workpieces are welded at any desired spots thereon by resistance spot welding machines. In this manner, the welded workpieces have a sufficient level of mechanical strength.

The two-stage welding process, however, increases the number of steps of the automobile manufacturing process, increases the period of time required to produce each automobile, and lowers the efficiency with which automobiles are manufactured. Furthermore, the two-stage welding process is responsible for an increase in the length of automobile production lines and an increase in the number of automobile body carriages, the number of clamp jigs, and the number of spot welding machines. As a consequence, the automobile production lines are relatively costly, making it relatively expensive to manufacture automobiles. Another problem is that if the tip of a welding gun of a welding robot sticks to a workpiece while the workpiece is being spot-welded, the welding gun pulls the workpiece when the welding robot is displaced, tending to deform the workpiece. The spot-welding process is disadvantageous in that the automobile production line needs to be shut down in order to dress the tip of the welding gun, and hence the efficiency of the automobile production line cannot be increased for this reason.

Various laser beam welding apparatus have been proposed in the art to eliminate the difficulties of the spot welding process. For example, Japanese patent publication No. 4-36792 discloses a multipoint welding apparatus having a plurality of welding heads. The welding heads are positioned in the vicinity of workpiece regions to be welded, and a desired one of the welding heads is selected by adjusting the angle of a plane mirror. A laser beam is applied through the selected welding head to the corresponding workpiece region to be welded. In this manner, a plurality of workpiece regions can be welded in a relatively short period of time.

However, the disclosed multipoint welding apparatus suffers various problems. Specifically, since the welding heads are fixed with respect to the workpiece, they can spot-weld the workpiece with a laser beam, but fail to seam-weld the workpiece. Because as many welding heads as the number of workpiece regions to be welded are necessary, the multipoint welding apparatus is highly expensive, and the number of welding heads and their positions must be changed depending on the type of workpieces to be welded. Such a changing process is tedious and time-consuming. In addition, inasmuch as the welding heads are positioned in the vicinity of workpiece regions to be welded, mirrors in the welding heads are liable to be smeared by sputtered materials during the welding process, and hence should be replaced or otherwise serviced frequently.

SUMMARY OF THE INVENTION

It is a general object of the present invention to provide a method of and an apparatus for welding a workpiece by dividing a laser beam with a beam splitter into a plurality of scanning welding heads by which respective laser beams are applied to respective regions of the workpiece to weld them simultaneously, so that the workpiece can be welded in a shortened period of time for manufacturing a product relatively inexpensively.

A major object of the present invention is to provide a method of and an apparatus for welding a workpiece by inserting a scanning welding head into the workpiece through an opening defined therein, and applying a laser beam from the scanning welding head to a region of the workpiece thereby to weld the workpiece region, for thereby reducing the number of regions which could not otherwise be welded due to positioning mechanisms which grip the workpiece, and minimizing the amount of work involved in a two-stage welding process, so that the period of time required to manufacture a product can be shortened, the number of spot welding machines required by the two-stage welding process can be reduced, and the cost of the product can be reduced.

Another object of the present invention is to provide a method of and an apparatus for welding a workpiece by displacing a scanning welding head to a region sufficiently spaced from a region of the workpiece to be welded, and applying a laser beam from the scanning welding head to the workpiece, for preventing a mirror of the scanning welding head from being smeared by sputtered materials during the welding process, so that the mirror does not need to be replaced or otherwise serviced frequently.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
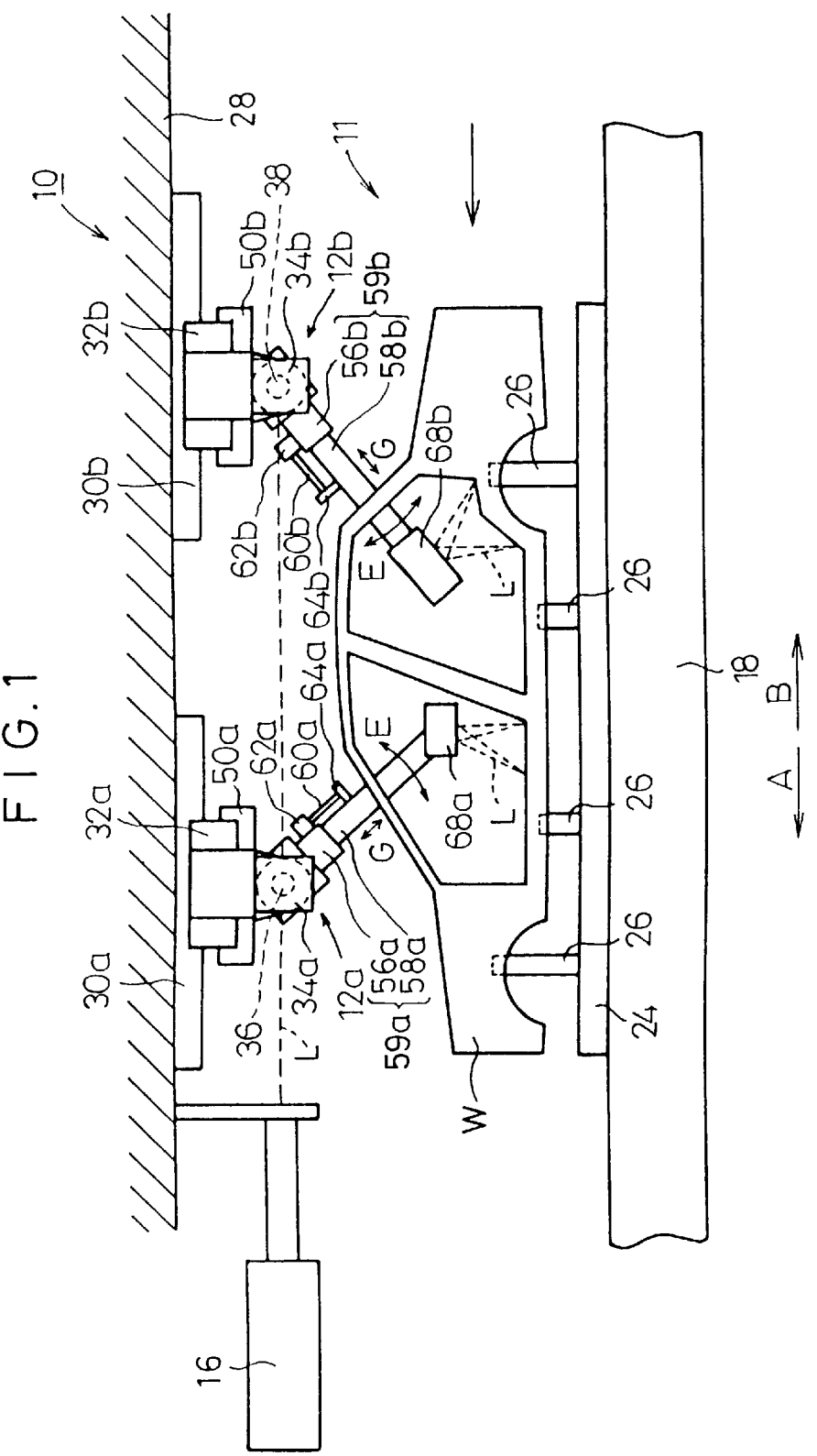
FIG. 1 is a side elevational view of a welding apparatus according to the present invention.
Figure 2:
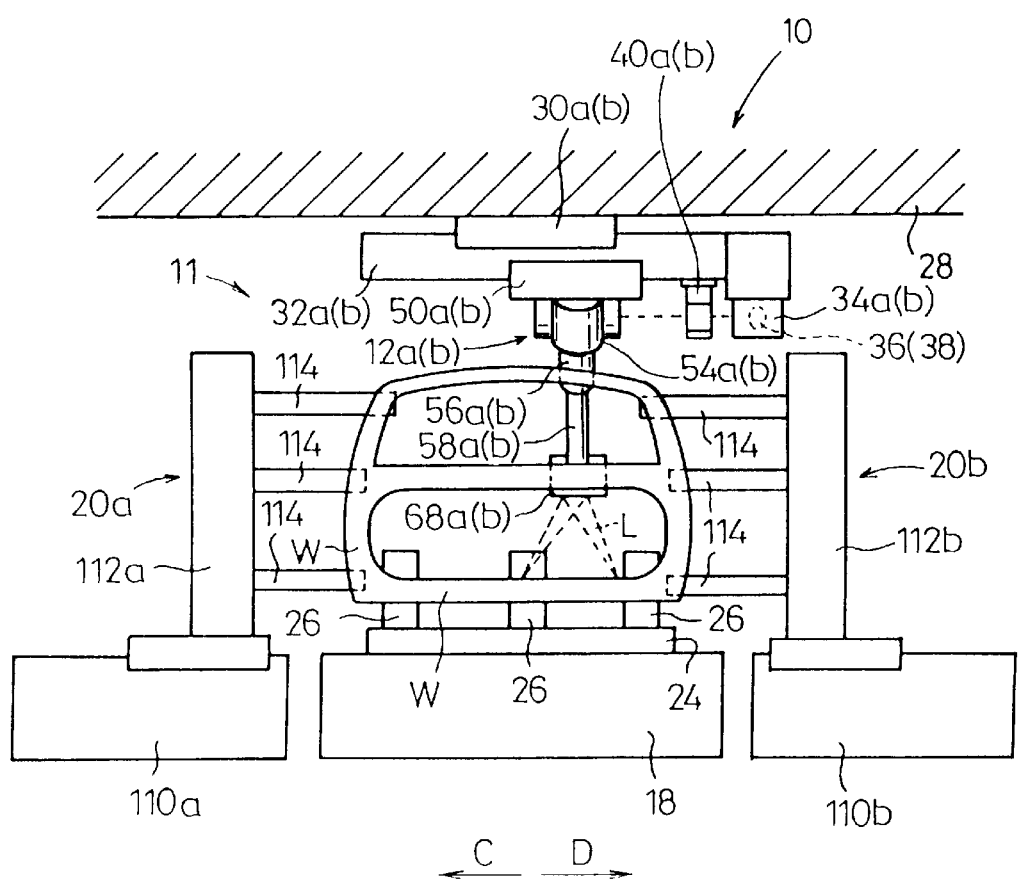
FIG. 2 is a front elevational view of the welding apparatus shown in FIG. 1.

As shown in FIGS. 1 and 2, a welding apparatus 10 according to the present invention generally comprises two welding robots 12a, 12b installed in a welding station 11, a laser beam emitting device 16 for supplying a laser beam L to the welding robots 12a, 12a, a feed mechanism 18 for delivering a workpiece W, which is illustrated as an automobile body, to the welding station 11, and two positioning mechanisms 20a, 20b positioned one on each side of the workpiece W in the welding station 11 for positioning and fixing the workpiece W that has been delivered to the welding station 11.

The feed mechanism 18 has a delivery carriage 24 on which a plurality of clamps 26 are fixedly mounted. The workpiece W is supported on the delivery carriage 24 by the clamps 26 and delivered to the welding station 11 by the feed mechanism 18.

Figure 3:
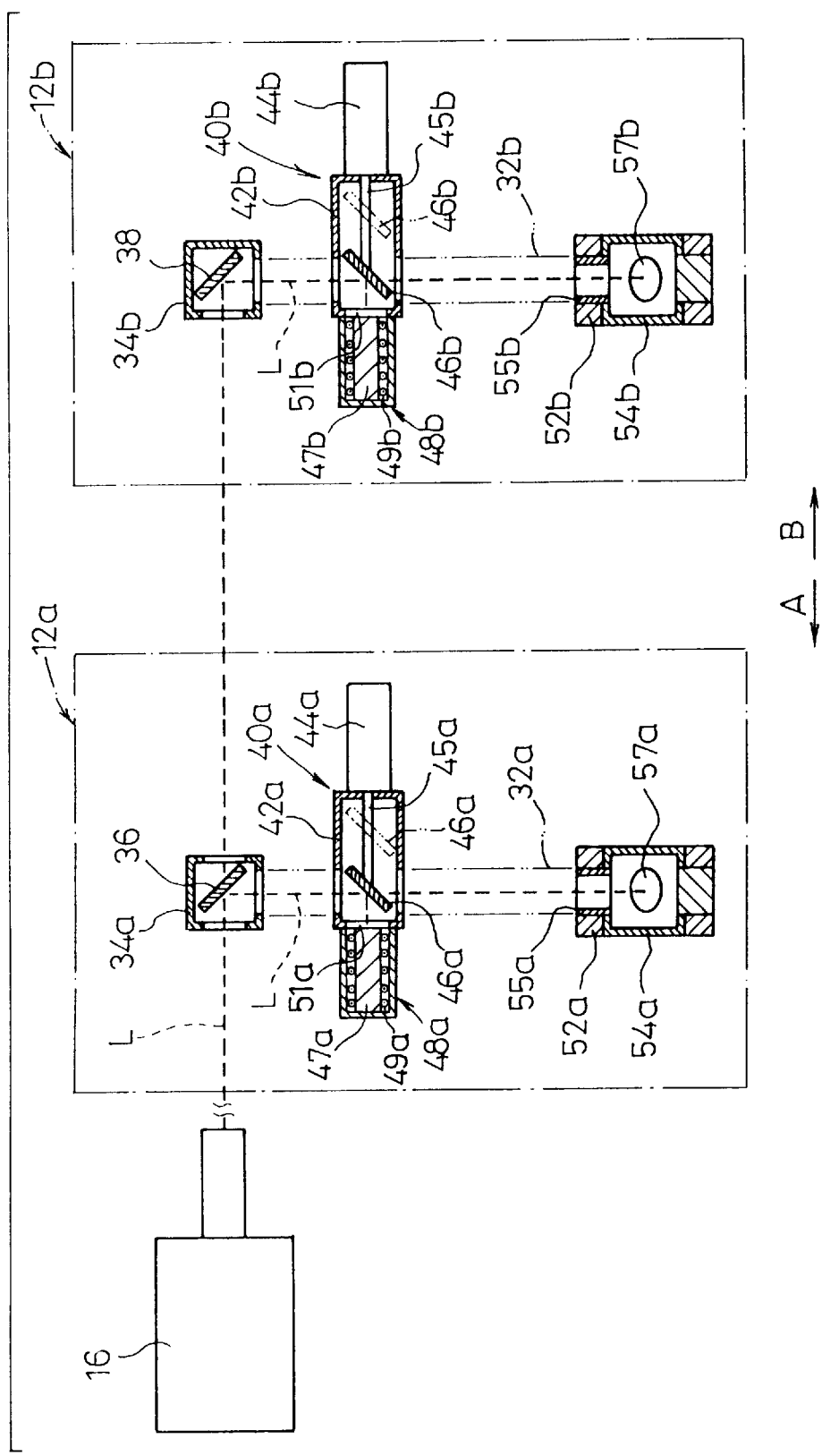
FIG. 3 is an enlarged plan view, partly in cross section, of a portion of the welding apparatus shown in FIG. 1.

The welding robots 12a, 12b have respective guide rails 30a, 30b mounted on an upper plate 28 which provides an upper surface in the welding station 11. The guide rails 30a, 30b extend horizontally in the directions indicated by the arrows A, B in FIG. 1. Slides 32a, 32b are slidably mounted on the respective guide rails 30a, 30b for sliding movement in the directions indicated by the arrows A, B. As shown in FIG. 2, the slides 32a, 32b comprise elongate members extending in the directions indicated by the arrows C, D transverse to the directions indicated by the arrows A, B. Casings 34a, 34b are fixed to respective ends of the slides 32a, 32b. As shown in FIG. 3, the casing 34a houses a beam splitter 36 therein, and the casing 34b houses a totally reflecting mirror 38 therein. The beam splitter 36 and the totally reflecting mirror 38 are positioned in the path of the laser beam L from the laser beam emitting device 16, and are inclined at about 45° to the path of the laser beam L.

Shutter mechanisms 40a, 40b are mounted respectively on the slides 32a, 32b near the respective casings 34a, 34b. The shutter mechanisms 40a, 40b have respective elongate casings 42a, 42b which support linear actuators 44a, 44b on respective ends thereof. The linear actuators 44a, 44b have respective horizontal rods 45a, 45b projecting respectively into the casings 42a, 42b. The rods 45a, 45b support on their inner distal ends respective mirrors 46a, 46b that are fixedly inclined at about 45° to respective paths of the laser beam L which is reflected by the beam splitter 36 and the totally reflecting mirror 38. When the linear actuators 44a, 44b are operated, the mirrors 46a, 46b are displaced in the direction indicated by the arrow A or B to reflect or pass the laser beam L. Specifically, when the mirrors 46a, 46b are displaced in the direction indicated by the arrow A, the mirrors 46a, 46b are moved into the solid-line positions shown in FIG. 3 in which the mirrors 46a, 46b reflect the laser beam L, and when the mirrors 46a, 46b are displaced in the direction indicated by the arrow B, the mirrors 46a, 46b are moved out of the laser beam paths into the two-dot-and-dash-line positions shown in FIG. 3 in which the mirrors 46a, 46b do not reflect the laser beam L.

The casings 42a, 42b support on the other ends thereof respective laser beam heat-exchanger mechanisms 48a, 48b. When the mirrors 46a, 46b are moved into the solid-line positions shown in FIG. 3, the mirrors 46a, 46b reflect and apply the laser beam L to the laser beam heat-exchanger mechanisms 48a, 48b. The laser beam heat-exchanger mechanisms 48a, 48b comprise respective heat absorbing mechanisms 47a, 47b for converting the energy of the applied laser beam L into heat and storing the heat, and respective water-cooled mechanisms 49a, 49b which comprise respective coiled pipes surrounding the heat absorbing mechanisms 47a, 47b, for cooling the heat absorbing mechanisms 47a, 47b, respectively. The heat absorbing mechanisms 47a, 47b formed substantially cylindrically are made of aluminum, for example, and have respective heat absorbing surfaces 51a, 51b each coated with a laser beam absorbing surface layer such as an anodized layer.

Figure 4:
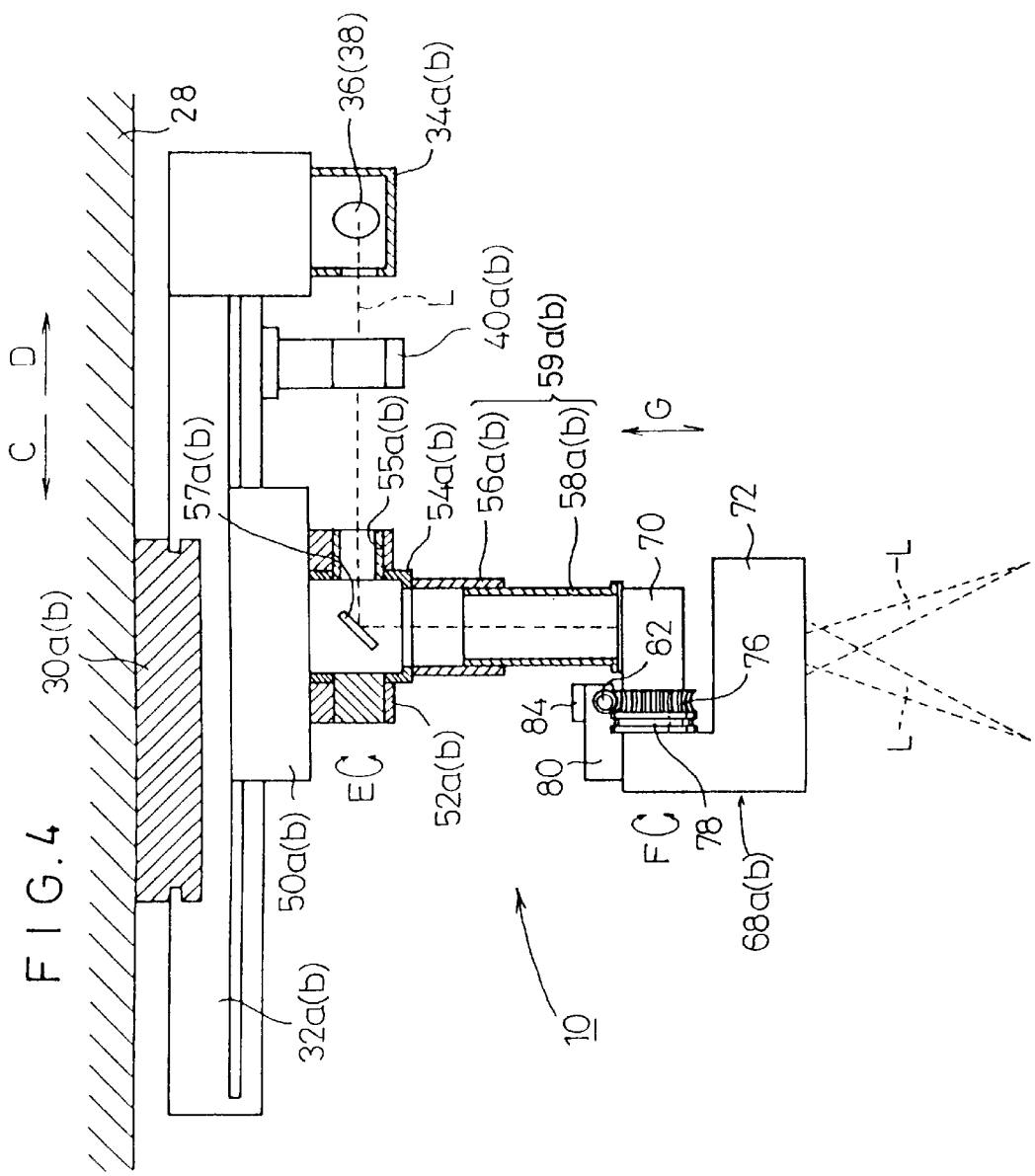
FIG. 4 is an enlarged front elevational view, partly in cross section, of a welding robot of the welding apparatus shown in FIG. 1.

As shown in FIG. 4, slides 50a, 50b are slidably mounted on the respective slides 30a, 30b for sliding movement along the respective slides 30a, 30b in the directions indicated by the arrows C, D. Casings 54a, 54b are angularly movably mounted on the respective slides 50a, 50b by respective shafts 55a, 55b for angular movement in the directions indicated by the arrow E. The casings 54a, 54b house respective mirrors 57a, 57b therein. First cylindrical tubes 56a, 56b are vertically fixed to lower surfaces of the respective casings 54a, 54b, and second cylindrical tubes 58a, 58b are vertically telescopically fitted respectively in and extend below the first cylindrical tubes 56a, 56b. The first cylindrical tubes 56a, 56b and the second cylindrical tubes 58a, 58b jointly make up arms 59a, 59b. When the second cylindrical tubes 58a, 58b are displaced into and out of the first cylindrical tubes 56a, 56b, the arms 59a, 59b are extended and contracted. The first cylindrical tubes 56a, 56b and the second cylindrical tubes 58a, 58b are coupled to each other by ball screws 60a, 60b (see FIG. 1). The ball screws 60a, 60b have ends connected to respective stepping motors 62a, 62b fixed to outer circumferential surfaces of the first cylindrical tubes 56a, 56b and opposite ends threaded in respective nuts 64a, 64b fixed to outer circumferential surfaces of the second cylindrical tubes 58a, 58b. When the stepping motors 62a, 62b are energized, the second cylindrical tubes 58a, 58b are axially moved with respect to the first cylindrical tubes 56a, 56b by the ball screws 60a, 60b in the directions indicated by the arrow G.

Figure 5:
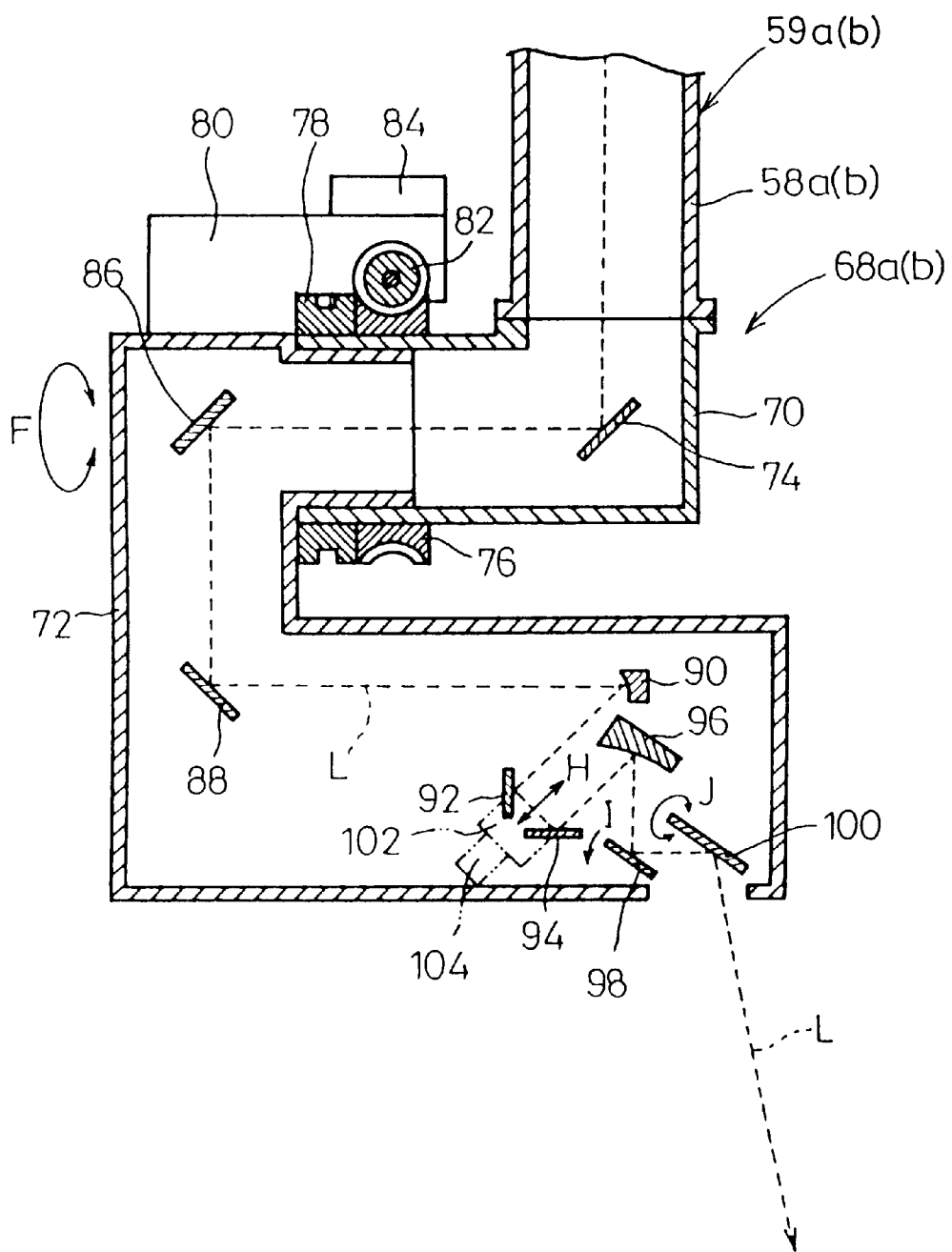
FIG. 5 is an enlarged fragmentary vertical cross-sectional view of a scanning welding head of the welding robot shown in FIG. 4.

Scanning welding heads 68a, 68b are secured respectively to lower ends of the second cylindrical tubes 58a, 58b. As shown in FIG. 5, each of the scanning welding heads 68a, 68b has a housing 70 fixed to the lower end of one of the second cylindrical tubes 58a, 58b and a housing 72 coupled to the housing 70 for angular movement in the directions indicated by the arrow F. The housing 70 accommodates a mirror 74 therein. The housing 70 has an end fitted over an end of the housing 72, and a worm wheel 76 and a rotation guide 78 are fixedly mounted on the end of the housing 70. The worm wheel 76 is held in mesh with a worm 82 supported on a bracket 80 which is affixed to the housing 72. The worm 82 can be rotated by a stepping motor 84 supported on the bracket 80. The rotation guide 78 engages the bracket 80.

The housing 72 accommodates mirrors 86, 88 therein. The laser beam L emitted from the laser beam emitting device 16 enters the casings 34a, 34b, is reflected by the beam splitter 36, the totally reflecting mirror 38 and the mirrors 57a, 57b, and passes through the first and second cylindrical tubes 56a, 56b, 58a, 58b into the scanning welding heads 68a, 68b in which the laser beam L is reflected by the mirrors 74, 86, 88. The laser beam L reflected by the mirror 88 travels toward a parabolic mirror 90, two mirrors 92, 94, an elliptic mirror 96, and two scanning mirrors 98, 100 which are all accommodated in the housing 72. The mirrors 92, 94 which extend at a predetermined angle to each other are supported on a holder 102, and can be moved back and forth in the directions indicated by the arrow H by a stepping motor 104 that is coupled to the holder 102. The scanning mirrors 98, 100 can be angularly moved by respective servomotors (not shown) in the respective directions indicated by the arrows I, J for thereby deflecting the laser beam L.

As shown in FIG. 2, the positioning mechanisms 20a, 20b are positioned one on the feed mechanism 18, and comprise respective columns 112a, 112b which are movable along bases 110a, 110b in the directions indicated by the arrows C, D, and a plurality of horizontal clamps 114 mounted on each of the columns 112a, 112b for positioning and fixing the workpiece W.

Operation of the welding apparatus 10 according to the present invention will be described below.

As shown in FIG. 3, the mirrors 46a, 46b of the shutter mechanisms 40a, 40b are displaced into the two-dot-and-dash-line positions by the linear actuators 44a, 44b.

Thereafter, as shown in FIG. 1, a workpiece W, such as an automobile body, fixed to the delivery carriage 24 by the clamps 26 is delivered into the welding station 11 by the feed mechanism 18. The positioning mechanisms 20a, 20b disposed one on each side of the workpiece W introduced into the welding station 11 are displaced along the bases 110a, 110b toward the workpiece W, and then the clamps 114 on the columns 112a, 112b clamp corresponding outer surface portions of the workpiece W for thereby positioning and fixing the workpiece W in the welding station 11.

The welding robots 12a, 12b then move the respective scanning welding heads 68a, 68b to respective given positions. Specifically, the welding robots 12, 14 insert their scanning welding heads 68a, 68b into openings of the workpiece W, e.g., a front window opening and a rear window opening of the workpiece W, as shown in FIG. 1. The slides 32a, 32b move along the guide rails 30a, 30b in the direction indicated by the arrow A or B, and the slides 50a, 50b move along the respective slides 32a, 32b in the direction indicated by the arrow C or D (see FIG. 2). The scanning welding heads 68a, 68b, the casings 54a, 54b, the first cylindrical tubes 56a, 56b, and the second cylindrical tubes 58a, 58b are angularly moved about the shafts 55a, 55b in the direction indicated by the arrow E (see FIG. 4). In order to apply the laser beam L to given welding regions within the workpiece W, the stepping motors 62a, 62b are energized to rotate the ball screws 60a, 60b meshing with the nuts 64a, 64b for thereby displacing the second cylindrical tubes 58a, 58b with respect to the first cylindrical tubes 56a, 56b in the direction indicated by the arrow G for thereby extending the arms 59a, 59b (see FIG. 1). At the same time, the stepping motor 84 on each of the scanning welding heads 68a, 68b is also energized to rotate the worm 82 meshing with the worm wheel 76 for thereby angularly moving the housing 72 in the directions indicated by the arrow F. As a result, the scanning welding heads 68a, 68b are positioned in respective given positions within the workpiece W, whereupon the laser beam welding apparatus is ready for welding the workpiece W.

The laser beam emitting device 16 is energized to emit a laser beam L. The laser beam L emitted from the laser beam emitting device 16 is applied to the beam splitter 36 (see FIG. 3) in the casing 34a of the welding robot 12a. The beam splitter 36 reflects about 50% of the energy of the laser beam L and passes the remaining 50% of the energy of the laser beam L therethrough. The laser beam L that has passed through the beam splitter 36 is reflected by the totally reflecting mirror 38 in the casing 34b of the other welding robot 12b. The laser beam L reflected by the beam splitter 36 and the totally reflecting mirror 38 is introduced into the casings 42a, 42b of the shutter mechanisms 40a, 40b. Since the mirrors 46a, 46b of the shutter mechanisms 40a, 40b have been displaced into the two-dot-and-dash-line positions shown in FIG. 3, the laser beam L travels through the casings 42a, 42b toward the mirrors 57a, 57b in the respective casings 54a, 54b.

The laser beam L is then reflected by the mirrors 57a, 57b through the first cylindrical tubes 56a, 56b and the second cylindrical tubes 58a, 58b into the scanning welding heads 68a, 68b (see FIG. 4). In each of the scanning welding heads 68a, 68b, the laser beam L is reflected by the mirrors 74, 86, 88 (see FIG. 5) and then reflected and converged by the parabolic mirror 90, after which the laser beam L is reflected by the reflecting mirrors 92, 94 toward the elliptic mirror 96. The laser beam L which is reflected and converged by the elliptic mirror 96 is deflected by the scanning mirrors 98, 100 that are angularly moved by the servomotors in the respective directions indicated by the arrows I, J, while at the same time the laser beam L is focused into a desired beam spot by the reflecting mirrors 92, 94 that are moved by the stepping motor 104 in the directions indicated by the arrow H. The laser beam L thus controlled is applied to desired welding regions within the workpiece W for thereby welding the workpiece W (see FIGS. 1 and 2).

For stopping the welding of the workpiece W with one of the welding robots 12a, the laser beam L is blocked from being supplied into the scanning welding head 68a by the shutter mechanism 40a of the welding robots 12a (see FIGS. 3 and 4). Specifically, when the rod 45a of the linear actuator 44a is displaced in the direction indicated by the arrow A to move the mirror 46a into the solid-line position shown in FIG. 3, the laser beam L is reflected by the mirror 46a and applied to the heat absorbing surface 51a of the laser beam heat-exchanger mechanism 48a, which converts the energy of the laser beam L into heat. As a result, the temperature of the heat absorbing mechanism 47a increases. The heat absorbing mechanism 47a which is thus heated is cooled by cooling water that ingresses into the water-cooled mechanism 49a.

With the laser beam L no longer supplied to the scanning welding head 68a, the slide 32a is displaced along the guide rail 30a in the direction indicated by the arrow A or B (see FIG. 1), the slide 50a is displaced along the slide 32a in the direction indicated by the arrow C or D (see FIG. 4), the casing 54a is angularly moved in the direction indicated by the arrow E, and the second cylindrical tube 58a is displaced in the direction indicated by the arrow G for thereby moving the scanning welding head 68a within the workpiece W. The housing 72 of the scanning welding head 68a is angularly moved with respect to the housing 70 in the direction indicated by the arrow F (wee FIG. 5) to position the scanning welding head 68a in readiness for welding a next region in the workpiece W.

Then, the rod 45a of the linear actuator 44a is displaced in the direction indicated by the arrow B to move the mirror 46a into the two-dot-and-dash-line position shown in FIG. 3. The laser beam L passes through the shutter mechanism 40a, and is reflected by the mirror 57a into the scanning welding head 68a (see FIG. 5). The laser beam L is then reflected by the mirrors 74, 86, 88, the parabolic mirror 90, the mirrors 92, 94, the elliptic mirror 96, and the scanning mirrors 98, 100 toward the next region in the workpiece W, which is welded by the laser beam L. In this manner, a plurality of regions in the workpiece W can successively be welded.

For stopping the welding of the workpiece W with the other welding robot 12b, the shutter mechanism 40b is controlled to block the laser beam L from being supplied to the scanning welding head 68b. The scanning welding head 68b is moved to a next region in the workpiece W, and then the shutter mechanism 40b is actuated to apply the laser beam L to the next region in the workpiece W for thereby welding the workpiece W.

The welding robots 12a, 12b are controlled independently of each other for welding the workpiece W. Therefore, the period of time required to weld the workpiece W with the welding robots 12a, 12b is about half the period of time which would otherwise be consumed to weld the workpiece W with a single welding robot.

The scanning mirrors 98, 100 may be angularly moved and the mirrors 92, 94 may be moved simultaneously while the laser beam L is welding the workpiece W for enabling the welding robots 12, 14 to effect not only spot welding but also continuous welding, i.e., seam welding, on the workpiece W along various patterns such as circular and rectangular patterns.

In the illustrated embodiment, as described above, the laser beam L is divided and introduced into the welding robots 12a, 12b by the beam splitter 36, and the supply of the laser beam L to the welding robots 12a, 12b is selectively controlled for independently controlling the welding robots 12a, 12b to weld a plurality of regions in the workpiece W. As a consequence, the period of time required to manufacture a product, such as an automobile, of parts including the workpiece W on a production line is reduced, and hence the efficiency of the manufacturing process on the production line is increased.

Inasmuch as the laser beam L is used to weld the workpiece W, the scanning welding heads 68a, 68b are free of the problems of welding tip sticking and wear, which would otherwise occur with resistance spot welding, and do not require maintenance processes including welding tip dressing. Because the scanning welding heads 68a, 68b can apply the laser beam L to the workpiece from positioned that are displaced sufficiently away from regions, to be welded, in the workpiece W, the scanning mirrors 98, 100 are prevented from being smeared by sputtered materials during the welding process. Therefore, the scanning mirrors 98, 100 have a relatively long service life, and are not required to be replaced or otherwise serviced frequently. The efficiency of a production line incorporating the welding apparatus 10 is relatively high because the production line does not need to be shut down frequently for maintenance.

Another advantage offered by the welding apparatus 10 is that since the scanning welding heads 68a, 68b are inserted through respective openings into the workpiece W and apply the laser beam to desired regions in the workpiece W, many regions of the workpiece W can be welded by the welding apparatus 10 without being limited by the clamps 114 of the positioning mechanisms 20a, 20b which clamp outer surface portions of the workpiece W. Accordingly, the amount of work involved in any two-stage welding process that is required is minimized, so that the period of time required to manufacture a product can be shortened, the number of manufacturing steps is reduced, and the efficiency of the manufacturing process is improved.

When a different type of workpieces W is to be welded, only the feed mechanism 18 and the positioning mechanisms 20a, 20b need to be changed, and the other mechanisms including the welding robots 12a, 12b, the scanning welding heads 68a, 68b, etc. are not required to be replaced, but may be used regardless of the type of workpieces W. Consequently, the cost of the production line is relatively low, and the period of time required to modify the production line is relatively short. Furthermore, the positioning mechanisms 20a, 20b can be designed relatively freely without substantial limitations because they are only required to maintain a path for the laser beam L to be supplied to the welding robots 12a, 12b.

Although a certain preferred embodiment of the present invention has been shown and described in detail, it should be understood that various changes and modifications may be made therein without departing from the scope of the appended claims.

What is claimed is:

1. A method of welding a workpiece, comprising the steps of:

positioning the workpiece with positioning mechanisms;

energizing a laser beam emitting device to emit a laser beam;

applying the laser beam from the laser beam emitting device to a beam splitter to divide the laser beam into respective plural laser beams;

introducing the plural laser beams into respective movable scanning welding heads of a plurality of welding robots;

applying the plural laser beams from the scanning welding heads to a plurality of first regions to be welded of the workpiece to weld the workpiece at said first regions;

after the workpiece is welded at said plurality of first regions, blocking the plural laser beams from being introduced into the respective scanning welding heads;

thereafter, moving the scanning welding heads while said plural laser beams are being blocked; and;

applying the plural laser beams from the scanning welding heads to a plurality of further regions to be welded of the workpiece to weld the workpiece at said further regions.

2. A method according to claim 1, further comprising the steps of:

blocking the plural laser beams from being introduced into the scanning welding heads with respective shutter mechanisms; and successively repeating said step of applying the plural laser beams, said step of blocking the plural laser beams, and said step of moving the scanning welding heads to successively weld a plurality of regions of the workpiece.

3. A method according to claim 2, wherein said step of blocking the laser beam comprises the steps of:

applying the laser beam to respective heat absorbing surfaces of laser beam heat-exchanger mechanisms in said shutter mechanisms to convert energy of the laser beam to heat; and cooling heat absorbing mechanisms heated by the converted heat with respective water-cooled mechanisms.

4. A method according to claim 3, wherein said step of blocking the laser beam further comprises the steps of:

operating respective actuators of said shutter mechanisms to displace respective mirrors coupled to said actuators into paths of the laser beam for thereby reflecting the laser beam from the mirrors toward said laser beam heat-exchanger mechanisms, so that the energy of the laser beam can be converted into heat by said laser beam heat-exchanger mechanisms.

5. A method according to claim 1, further comprising the step of:

after the workpiece is positioned with the positioning mechanisms, inserting said scanning welding heads through respective openings of the workpiece into said workpiece, and wherein said step of applying the laser beam comprises the step of:

applying the laser beam to regions, to be welded, within the workpiece to weld the workpiece.

6. A method according to claim 5, wherein said step of inserting said scanning welding heads through the respective openings of the workpiece comprises the step of:

extending extensible and contractable arms of said welding robots which support said scanning welding heads, thereby to insert said scanning welding heads into the workpiece.

7. A method according to claim 6, wherein said step of inserting said scanning welding heads through the respective openings of the workpiece comprises the step of:

displacing second cylindrical tubes telescopically disposed In respective first cylindrical tubes of said arms in the direction in which said extensible and contractable arms are extended, thereby to insert said scanning welding heads into the workpiece.

* * * * *